Patented Apr. 26, 1932

1,855,744

UNITED STATES PATENT OFFICE

HORACE H. HOPKINS, OF PHILADELPHIA, PENNSYLVANIA, AND JOHN B. SEGUR, OF CHICAGO, ILLINOIS, ASSIGNORS TO E. I. DU PONT DE NEMOURS & COMPANY, OF WILMINGTON, DELAWARE, A CORPORATION OF DELAWARE

CELLULOSE ETHER COMPOSITIONS

No Drawing. Application filed May 24, 1928. Serial No. 280,376.

This invention relates to certain new cellulose ether compositions, and more particularly to such compositions containing binary or multiple solvents having abnormal solvent power.

It is an object of this invention to prepare cellulose ether compositions from various types of cellulose ethers by the use of certain solvents having ordinary solvent power, together with a solvent having either a limited or no solvent power, and preferably being an inexpensive solvent. A further object is to prepare such a solution or mixture wherein the solvents have a greater combined solvent power than the solvent powers of the separate ingredients, in other words, to prepare a cellulose ether solution from binary or multiple solvents having an abnormal solvent power. A still further object is to utilize a non-solvent or partial solvent in conjunction with the solvent, so that the dispersing power of the joint solution shall be greater than in the case of either ingredient, and so that the combined solvents will have a tendency to either lower the viscosity of the cellulose ether solution or to maintain the solution at a relatively low viscosity. Further objects will appear as the following specification proceeds.

While the invention may be exhibited by various embodiments, the following have been found to be illustrative thereof:

*Example 1.*—We take an ethyl cellulose soluble in butyl alcohol but not soluble in gasoline, and prepare from this ethyl cellulose a butyl alcohol solution containing 8% of the ethyl cellulose. The result is a solution having a viscosity of 2.75 poises. To this solution gasoline is added in the portions 2 parts butyl alcohol to 1 part gasoline, and the viscosity of the mixture was found to have the value 1.44 poises. We have found that we may vary the proportion of non-solvent to a certain extent, and that the variation in viscosity is small for mixtures containing the non-solvent in proportions varying from ⅓ to ⅔ of the whole.

*Example 2.*—We prepare a solution of an ethyl cellulose containing butyl alcohol and benzine in the proportions of 8 parts ethyl cellulose, 33 parts butyl alcohol, and 67 parts benzine. In this solution the alcohol and benzine have combined solvent power distinctly in excess of the sum of the separate solvent powers.

*Example 3.*—We prepare a composition as follows:

| | Parts |
|---|---|
| Ethyl cellulose | 25 |
| Mono ethyl ether of ethylene glycol | 50 |
| Gasoline | 50 |

This composition also exhibits the same phenomena, in that the alcohol and gasoline solvents have a distinctly higher dispersing power than the sum of the separate dispersing powers or solvent powers of the two solvents.

*Example 4.*—We prepare a composition as follows:

| | Parts |
|---|---|
| Ethyl cellulose | 10 |
| Rosin ester | 5 |
| Blown linseed oil | 10 |
| Butyl lactate | 2 |
| Drier | 1 |
| Butyl alcohol | 18½ |
| Gasoline | 55½ |

In this example, also, the alcohol and gasoline have a combined dispersing or solvent power greatly in excess of the sum of the solvent powers of the two substances, gasoline being substantially the non-solvent.

We find that with such binary solvents, if the ethyl cellulose be dissolved in the alcohol component and the second component be added in increasing proportions, the concentration of the ethyl cellulose being constant, there is noted at first a continuous increase in dispersing power, and this will reach a maximum, which in general corresponds to a greatly increased solvent power and decreased viscosity in comparison with that obtained when the ethyl cellulose is dissolved in the alcohol solvent alone. As one mode of practicing our invention we dissolve the ethyl cellulose in the alcoholic component of the abnormal solvent binary and add the aliphatic hydrocarbon component until the desired viscosity reduction and the desired degree of volatility are attained. It is also possible to first mix the components of the binary solvent and dissolve the ethyl cellulose in the mixture. For many purposes we find that we can use solvent mixtures containing approximately ⅓ alcoholic body and ⅔ hydrocarbon. But these proportions may be varied, and we have found we can use mixtures containing as low as 15% alcoholic body or as high as 70% alcoholic body.

In formulating ethyl cellulose compositions suitable for the many different uses of the arts, we use as a basis the solution of ethyl cellulose in the abnormal solvent binary as described, and to this we add as desired other diluents, blending agents, etc., and also other solvents such as low boilers, high boilers, etc. In order to modify the characteristics of the composition, the plastic or the film, we may add to this ethyl cellulose some other cellulose derivative, for example, nitrocellulose, cellulose acetate, etc., and also resins, gums, plasticizers, pigments, coloring materials, fillers, etc.

Various modifications of the invention may be made. As a first component of the abnormal solvent binary constituting the active cellulose solvent, we may use various alcoholic compounds or bodies liquid at ordinary temperatures. That is, we may use monohydroxy aliphatic alcohols, such as, methyl alcohol, ethyl alcohol, propyl alcohol, butyl alcohol, amyl alcohol, allyl alcohol, etc.; or, we may use a monohydroxy aromatic alcohol, such as, benzyl alcohol; or we may use a monohydroxy carbocyclic alcohol, such as, cyclohexanol; or we may use a mono-derivative of a dihydroxy alcohol, such as the mono ethyl ether of ethylene glycol; or we may use a di-derivative of a trihydroxy alcohol, such as the diethyl ether of glycerol; or we may use a neutral compound derived from a monohydroxy acid, for example, ethyl lactate.

As the second component of our abnormal solvent binary we may use an aliphatic hydrocarbon, preferably one liquid at ordinary temperature and having a boiling point lying between 30° and 250° C., such as pentene, hexane, heptane, amylene, hexylene, and heptylene. In addition, we may use mixtures or distillates containing such hydrocarbons in various proportions, for example, commercial distillates such as benzine, gasoline or kerosene. It is to be further understood that the abnormal solvent binaries suitable for our use include active ethyl cellulose solvent mixtures of the two component type, of which the first, or alcohol component may be an alcoholic body as described, or it may consist of mixtures of two or more such components in any useful proportion. The second, or aliphatic hydrocarbon component of said binary, may consist of an aliphatic hydrocarbon as described, or of mixtures of such hydrocarbons. In cases where the alcohol and hydrocarbon components are not miscible in all proportions, it is advantageous to add a blending agent or a mutual solvent to facilitate the mixture. We have found that we can so proportion our mixtures that for various purposes the proportions may range from 3 of alcohol to 1 of aliphatic hydrocarbon, up to 1 of alcohol to 6 or more of aliphatic hydrocarbon. By the term "alcoholic body" we mean the alcohols described in the foregoing and their equivalents, and by the term "aliphatic hydrocarbon" we include gasoline, benzine, and the other aliphatic hydrocarbons described above, together with their equivalents.

Where the generic terms "a monohydroxy alcoholic liquid" and "an aliphatic hydrocarbon having a boiling point between 30–250° C." are used in the claims, it is not intended that the claims should thereby be limited to a solvent mixture including only a single specific substance falling within the scope of the generic term as obviously two or more specific substances may be used as long as the proportions of each type of ingredient fall within the proportions recited in the claims. For example, the monohydroxy alcoholic component can comprise a mixture of ethyl and butyl alcohol and the aliphatic hydrocarbon component a mixture of various hydrocarbons as found in the commercial distillates such as benzine, gasoline, et cetera.

As many apparently widely different embodiments of this invention may be made without departing from the spirit thereof, it is to be understood that we do not limit ourselves to the foregoing examples or description except as indicated in the following patent claims.

We claim:

1. Composition comprising ethyl cellulose dispersed in a solvent mixture consisting of one part butyl alcohol and 0.5 to 2.0 parts gasoline.

2. Composition comprising ethyl cellulose dispersed in a solvent mixture consisting of 1 part butyl alcohol and 0.5 to 2.0 parts of an aliphatic hydrocarbon having a boiling point between 30–250° C.

3. Composition comprising ethyl cellulose dispersed in a solvent mixture consisting of 1 part of a monohydroxy alcoholic liquid and 0.5 to 2.0 parts of an aliphatic hydrocarbon having a boiling point between 30–250° C.

4. Composition comprising an alkyl cellulose ether dispersed in a solvent mixture consisting of 1 part butyl alcohol and 0.5 to 2.0 parts of an aliphatic hydrocarbon having a boiling point between 30–250° C.

5. Composition comprising an alkyl cellulose ether dispersed in a solvent mixture consisting of 1 part of a monohydroxy alcoholic liquor and 0.5 to 2.0 parts of an aliphatic hydrocarbon having a boiling point between 30–250° C.

6. Composition comprising ethyl cellulose dispersed in a solvent mixture consisting of 1 part butyl alcohol and 0.33 to 6.0 parts gasoline.

7. Composition comprising ethyl cellulose dispersed in a solvent mixture consisting of 1 part of a monohydroxy alcoholic liquor and 0.33 to 6.0 parts of an aliphatic hydrocarbon having a boiling point between 30–250° C.

8. Composition comprising an alkyl cellulose ether dispersed in a solvent mixture consisting of 1 part butyl alcohol and 0.33 to 6.0 parts gasoline.

9. Composition comprising an alkyl cellulose ether dispersed in a solvent mixture consisting of 1 part of a monohydroxy alcoholic liquor and 0.33 to 6.0 parts of an aliphatic hydrocarbon having a boiling point between 30–250° C.

In testimony whereof we affix our signatures.

HORACE H. HOPKINS.
JOHN B. SEGUR.